US010974995B1

(12) United States Patent
Lihn et al.

(10) Patent No.: US 10,974,995 B1
(45) Date of Patent: Apr. 13, 2021

(54) METHOD FOR FABRICATION OF A CERAMIC MATRIX COMPOSITE SANDWICH STRUCTURE

(71) Applicant: HRL Laboratories, LLC, Malibu, CA (US)

(72) Inventors: Christine M. Lihn, Culver City, CA (US); Jacob M. Hundley, Newbury Park, CA (US); Tobias A. Schaedler, Oak Park, CA (US); Eric C. Clough, Santa Monica, CA (US); Kenneth Cante, La Puente, CA (US)

(73) Assignee: HRL Laboratories, LLC, Malibu, CA (US)

( * ) Notice: Subject to any disclaimer, the term of this patent is extended or adjusted under 35 U.S.C. 154(b) by 392 days.

(21) Appl. No.: 15/643,389

(22) Filed: Jul. 6, 2017

(51) Int. Cl.
*C04B 35/634* (2006.01)
*C04B 35/645* (2006.01)
*B29D 11/00* (2006.01)
*G02B 6/12* (2006.01)
*C03B 11/14* (2006.01)
*G02B 6/138* (2006.01)
*C04B 35/80* (2006.01)

(52) U.S. Cl.
CPC ...... *C04B 35/634* (2013.01); *B29D 11/00663* (2013.01); *C03B 11/14* (2013.01); *C04B 35/6455* (2013.01); *C04B 35/80* (2013.01); *G02B 6/12002* (2013.01); *G02B 6/138* (2013.01)

(58) Field of Classification Search
None
See application file for complete search history.

(56) References Cited

U.S. PATENT DOCUMENTS

| 6,294,125 B1 * | 9/2001 | Bridgewater ......... C04B 35/571 264/261 |
| 6,451,416 B1 * | 9/2002 | Holowczak ............. B32B 18/00 428/293.4 |
| 7,382,959 B1 | 6/2008 | Jacobsen |
| 8,197,930 B1 | 6/2012 | Jacobsen et al. |
| 8,320,727 B1 | 11/2012 | Jacobsen et al. |
| 9,352,529 B2 * | 5/2016 | Clough .................... E04B 1/86 |
| 2002/0022422 A1 * | 2/2002 | Waldrop, III ......... B29C 70/443 442/179 |

(Continued)

OTHER PUBLICATIONS

Ferraris, M. et al., "Glass-ceramic joining and coating of SiC/SiC for fusion applications", Journal of Nuclear Materials, 1998, pp. 1546-1550.

(Continued)

*Primary Examiner* — Marc C Howell
*Assistant Examiner* — Asha A Thomas
(74) *Attorney, Agent, or Firm* — Lewis Roca Rothgerber Christie, LLP (57) ABSTRACT

A method for fabricating a ceramic matrix composite structure. A core having an ordered structure is fabricated of a preceramic polymer and pyrolyzed. Facesheets, either uncured or cured, are placed on the core (with a bonding layer of preceramic polymer resin if the facesheets are cured) and the assembly is cured and pyrolyzed. The pyrolyzed assembly is re-infiltrated with preceramic polymer resin and re-pyrolyzed. The cycle of re-infiltration and re-pyrolyzation is repeated until the mass gain per cycle stabilizes.

20 Claims, 11 Drawing Sheets

(56) References Cited

U.S. PATENT DOCUMENTS

| | | | | |
|---|---|---|---|---|
| 2002/0064615 A1* | 5/2002 | Wildenrotter | ............ | B64G 1/50 |
| | | | | 428/35.7 |
| 2015/0300019 A1* | 10/2015 | Li | .......................... | B32B 5/024 |
| | | | | 428/188 |
| 2017/0259502 A1* | 9/2017 | Chapiro | ................. | B33Y 10/00 |

OTHER PUBLICATIONS

Hurwitz, Frances I., "Improved Fabrication of Ceramic Matrix Composite/Foam Core Integrated Structures", Manufacturing & Prototyping, NASA Tech Briefs, Aug. 2009, p. 15.

Ortona, Alberto et al., "An integrated assembly method of sandwich structured ceramic matrix composites", Journal of the European Ceramic Society, 2011, 7 pages.

Riccardi, B. et al., "Issues of low activation brazing of $SiC_f$/SiC composites by using alloys without free silicon", Journal of Nuclear Materials, 2004, pp. 562-566.

* cited by examiner

METHOD FOR FABRICATION OF A CERAMIC MATRIX COMPOSITE SANDWICH STRUCTURE

GOVERNMENT LICENSE RIGHTS

This invention was made with U.S. Government support under contract No. HR0011-15-C-0053 awarded by the Defense Advanced Research Projects Agency (DARPA). The U.S. Government has certain rights in this invention.

CROSS-REFERENCE TO RELATED APPLICATION(S)

The present application is related to U.S. Pat. No. 8,320,727, filed on Jan. 11, 2008, entitled "COMPOSITE STRUCTURES WITH ORDERED THREE-DIMENSIONAL (3D) CONTINUOUS INTERPENETRATING PHASES", ("the '727 Patent"), the entire content of which is incorporated herein by reference.

The present application is related to U.S. Pat. No. 8,197,930, filed on May 10, 2007, entitled "THREE-DIMENSIONAL ORDERED OPEN-CELLULAR STRUCTURES", ("the '930 Patent"), the entire content of which is incorporated herein by reference.

The present application is related to U.S. Pat. No. 7,382,959, filed on Oct. 13, 2006, entitled "OPTICALLY ORIENTED THREE-DIMENSIONAL POLYMER MICROSTRUCTURES", ("the '959 Patent"), the entire content of which is incorporated herein by reference.

FIELD

One or more aspects of embodiments according to the present invention relate to composite materials, and more particularly to a method for fabricating ceramic matrix composite materials.

BACKGROUND

Sandwich structures, which may include (e.g., consist of) two thin, stiff skins connected by a thick but lightweight core, offer significantly increased flexural strength and torsional rigidity compared to monocoque or stiffened plate designs of equivalent mass. Polymer matrix composite and metallic sandwich designs may be used in low temperature automotive, naval and aircraft platforms (e.g., at temperatures less than 800° C.). Such composite materials may be poorly suited for elevated temperature applications (e.g., at temperatures greater than 800° C. and less than 1800° C.).

Related art fabrication of ceramic sandwich designs may use secondary bonding approaches or vapor infiltration methods. In the case of secondary bonding, the resulting interface may be a weak point in the structure. Vapor infiltration processes may require significant capital and labor expenditures as well as long duration cycle times, which may exceed 40 days. As a result of both of these factors, the fabrication cost may be high.

Thus, there is a need for a low-cost method for fabricating ceramic composite materials with high strength.

SUMMARY

Aspects of embodiments of the present disclosure are directed toward a method for fabricating a ceramic matrix composite structure. The method utilizes a co-processing approach to connect an interpenetrating core network to the facesheets by means of an engineered interface layer. For example, a core having an ordered structure is fabricated of a preceramic polymer and pyrolyzed. Facesheets, either uncured or cured, are placed on the core and the assembly is cured and pyrolyzed. The pyrolyzed assembly is re-infiltrated with preceramic polymer resin and re-pyrolyzed. The cycle of re-infiltration and re-pyrolyzation is repeated until the mass gain per cycle stabilizes.

According to an embodiment of the present invention there is provided a method for fabricating a composite structure, the method including: forming a core, the core including as a major component a material selected from the group consisting of ceramics and combinations thereof; forming a first facesheet, the first facesheet including as a major component a material selected from the group consisting of preceramic polymer resins, preceramic polymers, ceramics, and combinations thereof; placing the first facesheet on a first surface of the core; and subjecting a preceramic assembly to a first pyrolyzing process, the preceramic assembly including the first facesheet and the core.

In one embodiment, the method includes, after placing the first facesheet on the first surface of the core, and before subjecting the preceramic assembly to the first pyrolyzing process: subjecting the preceramic assembly to a curing process.

In one embodiment, the curing process includes evacuating a sealed enclosure, a first portion of the sealed enclosure being a vacuum bag containing the preceramic assembly.

In one embodiment, a second portion of the sealed enclosure is a caul plate, the sealed enclosure further containing one or more edge dams secured to the caul plate around a perimeter of the preceramic assembly.

In one embodiment, the subjecting of the preceramic assembly to the curing process includes applying pressure to the preceramic assembly with a hot press.

In one embodiment, the applying of pressure includes applying between 50 pounds per square inch and 100 pounds per square inch of pressure.

In one embodiment, the curing process further includes before evacuating the sealed enclosure, placing a layer of peel ply on the first facesheet and placing a layer of breather on the layer of peel ply.

In one embodiment, the method includes placing a second facesheet on a second surface of the core, and wherein the preceramic assembly further includes the second facesheet.

In one embodiment, the method includes before subjecting the preceramic assembly to a curing process, placing a layer of peel ply on the second facesheet and placing a layer of breather on the layer of peel ply.

In one embodiment, the method includes: a plurality of first truss elements defined by a plurality of first self-propagating preceramic polymer waveguides and extending along a first direction; a plurality of second truss elements defined by a plurality of second self-propagating preceramic polymer waveguides and extending along a second direction; and a plurality of third truss elements defined by a plurality of third self-propagating preceramic polymer waveguides and extending along a third direction.

In one embodiment, the forming of the core further includes pyrolyzing the preceramic polymer micro-truss.

In one embodiment, the first facesheet further includes a layer of veil.

In one embodiment, the layer of veil is a layer of carbon fiber veil.

In one embodiment, the method includes, after subjecting the preceramic assembly to the first pyrolyzing process: re-infiltrating a ceramic assembly with preceramic polymer resin under vacuum; and subjecting a re-infiltrated assembly to a second pyrolyzing process, wherein: the ceramic assembly is a result of subjecting the preceramic assembly to the first pyrolyzing process, and the re-infiltrated assembly is a result of re-infiltrating a ceramic assembly with preceramic polymer resin under vacuum.

In one embodiment, the method includes repeating re-infiltration and pyrolyzing cycles until the porosity is less than 1%.

In one embodiment, the first facesheet includes, as a major component, a material selected from the group consisting of preceramic polymers, ceramics, and combinations thereof.

In one embodiment, the method includes coating the first facesheet with a preceramic polymer resin before placing the first facesheet on a first surface of the core.

In one embodiment, the core is curved.

In one embodiment, the subjecting of the preceramic assembly to the first pyrolyzing process includes supporting the preceramic assembly on a curved surface of a graphite mold.

In one embodiment, forming of the core includes printing a preceramic polymer core with a three dimensional printer.

According to an embodiment of the present invention there is provided a ceramic matrix composite structure including: a pyrolyzed core; a pyrolyzed facesheet; and a secondary infiltrated and pyrolyzed material that mechanically interlocks the core with the facesheet.

In one embodiment, the pyrolyzed core includes: a plurality of pyrolyzed truss elements; and a fillet around a pyrolyzed truss element of the plurality of pyrolyzed truss elements at a junction between the pyrolyzed truss element and the pyrolyzed facesheet.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a method for fabrication of a ceramic matrix composite sandwich structure provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The characteristics of a sandwich structure may depend on the characteristics of the core material. Some related art core materials are stochastic materials, e.g., foams, that are composed of cells the sizes of which vary widely and randomly and that, as a result, are randomly positioned within the core. Such core structures may be generated from organic precursors using a replication method and may be formed in near net-shape by first shaping or machining the replicate material (e.g. polymer foam). The random nature of foam materials may result in a low-strength bending-dominated architecture that is further limited by voids, pores or cracks in the ceramic after replication.

Some related art core materials are instead ordered materials (e.g. discrete pins or woven preforms) that may have significantly increased strength per unit mass by virtue of their architecture. The ability to embed inorganic fiber reinforcement into these core materials may also increase their strength and toughness. The implementation of ordered core materials may be limited, however, by raw material and processing costs as well as manufacturing complexity for non-planar geometries. These engineered structures may require separate non-recurring design and assembly tooling for each sandwich component to be produced; this may not be economically viable for mass production.

Some embodiments of the present invention provide a compromise between the two different families of core materials. Like the stochastic cellular architectures, in some embodiments core materials can be rapidly produced in net-shape or near net-shape without expensive design software or assembly tooling. Unlike ceramic foams however, in some embodiments the core materials have a high strength, stretch-dominated architecture akin to a discrete pin or woven preform core.

In some embodiments a ceramic core (e.g., a core made by pyrolyzing a preceramic polymer structure) is combined with two facesheets, each of which is composed of reinforcing fiber in (i) a preceramic polymer matrix or in (ii) uncured preceramic polymer resin. The facesheets may then be cured if they are not already cured, and the sandwich structure may be subjected to a pyrolyzing process to form a ceramic sandwich structure.

Figure 1:
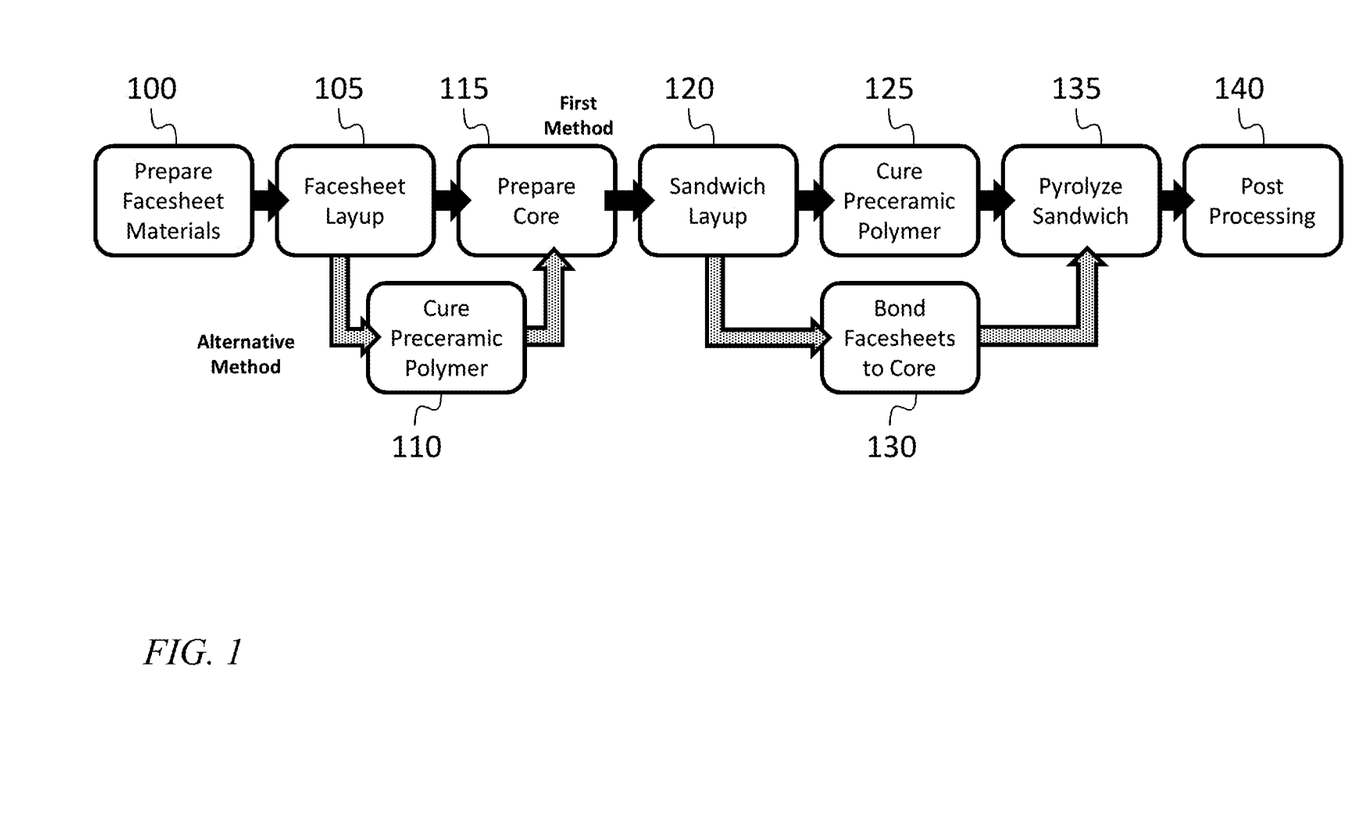
FIG. 1 is a flowchart of a method for fabricating a ceramic matrix composite sandwich structure, according to an embodiment of the present invention.

Referring to FIG. 1, in one embodiment facesheet materials are prepared in an act 100. The facesheets are made using dry or preimpregnated composites with ceramic fiber reinforcement (including carbon, SiC, SiOC, Alumina, or other fibers) in a weave, knit, or unidirectional fabric form. Additional layers of veil may also optionally be used as an interface (e.g., these layers may be laid over the surface of the facesheet that subsequently is placed against the core, and may function to absorb a quantity of preceramic polymer resin to aid in forming a bond to the core) to aid in bonding the facesheets to the core. The preceramic resin used for the facesheet matrix may be either thermally cured or radiation cured (e.g., cured using light, e.g., ultraviolet light) and may include components such as siloxane, sequisiloxane, carbosilane, or phenolics. Other preceramic compositions for formation of silicon carbide (SiC), silicon oxycarbide (SiOC), carbon, SiCN, SiBCN or other ceramics may also be used. As used herein, "resin", "photomonomer resin" or "preceramic resin" refers to a liquid formulation that when cured, e.g., using heat or ultraviolet light, forms a preceramic polymer. A "preceramic polymer" is a polymer that when pyrolyzed forms a ceramic material.

In an act 105, facesheets are laid up. The plies of ceramic fiber reinforcing material or of preimpregnated ceramic fiber reinforcing material are cut and, if dry (i.e., if not preimpregnated), wet out with the resin matrix. The face sheets are laid up on a graphite, aluminum, or steel mold (or "substrate"). In an optional act 110, the face sheets may be cured, e.g., thermally cured or cured using ultraviolet light.

The core may be prepared, in an act 115, as follows. In some embodiments a preceramic polymer core, e.g., a honeycomb structure or a micro-truss structure (e.g., as described in the '930 Patent, the '959 Patent, and the '727 Patent) may be used as a core for a ceramic matrix composite structure. A micro-truss preceramic polymer core may be fabricated as follows. Some liquid preceramic polymer resins, referred to herein as photo-initiated preceramic polymer resins, polymerize when exposed to light (e.g., UV light), and undergo a refractive index change during the polymerization process. Accordingly, a micro-truss core may be formed by illuminating a volume of a liquid photo-initiated preceramic polymer resin, through a mask having a plurality of openings, with collimated light, e.g., ultraviolet light. Light that enters the liquid photo-initiated preceramic polymer resin through an opening in the mask causes the liquid photo-initiated preceramic polymer resin to polymerize locally, causing a change in the index of refraction. The initial area of polymerization, such as a small circular area, "traps" the light and guides it to the tip of the polymerized region, further advancing that polymerized region. This process continues, leading to the formation of a self-propagating preceramic polymer waveguide structure with approximately (about) the same cross-sectional dimensions along its entire length. As such, a preceramic polymer core may be formed by using a fixed light input (collimated UV light) to cure (polymerize) liquid photo-initiated preceramic polymer resin and form waveguides, which may self-propagate in a three-dimensional (3D) pattern. If collimated light from three different directions is used, then the resulting preceramic polymer core may include a plurality of first truss elements defined by a plurality of first self-propagating preceramic polymer waveguides and extending along a first direction, a plurality of second truss elements defined by a plurality of second self-propagating preceramic polymer waveguides and extending along a second direction, and a plurality of third truss elements defined by a plurality of third self-propagating preceramic polymer waveguides and extending along a third direction.

A micro-truss structure may be formed in the shape of a substantially flat sheet in this manner, the sheet having a thickness corresponding to the depth of liquid photo-initiated preceramic polymer resin used to fabricate it, and transverse dimensions corresponding to those of the container used to hold the liquid photo-initiated preceramic polymer resin during fabrication. This sheet may be relatively soft and flexible, and the net shape (e.g., a core in the shape of a curved sheet) may be formed using a secondary UV exposure assisted by a mold or in free form. For example, the flat sheet may be draped over a curved mold and subjected to an additional exposure to ultraviolet light or to heat to cause it to set in the curved shape of the mold. It may then be removed from the mold. In other embodiments the core is fabricated using other methods, e.g., it may be printed using a suitable three dimensional (3D) printer. The shaped core may then be pyrolyzed to form a ceramic core. The core may then be cleaned with a solvent and sonication, or it may be electrochemically or ion etched, to prepare the core for bonding to the facesheets. The act 115 of preparing the core may be performed before, or after, or concurrently with, the acts 100, 105 (and optionally 110) involved in preparing the facesheets.

In an act 120, a sandwich structure may then be laid up. In one embodiment this act is performed with uncured facesheets, i.e., without the optional facesheet cure 110 having been performed. The sandwich structure is assembled on a substrate (or "caul plate") with the uncured facesheets and ceramic core. The facesheets are then laid up with the core and co-processed (i.e., cured after being laid up with the ceramic core) using heat only, a hot press, or an autoclave. Each of these curing processes may be completed with or without a vacuum bag setup. The co-processing of the facesheets, in which the pyrolyzed ceramic core is attached to the facesheets during the facesheet matrix cure cycle, may result in a stronger interface between the facesheets and the core in the final ceramic sandwich structure. Co-processing may be performed for both sandwich facesheets at the same time, or, in some embodiments, the individual facesheets are attached with separate processing steps (acts).

Figure 2:
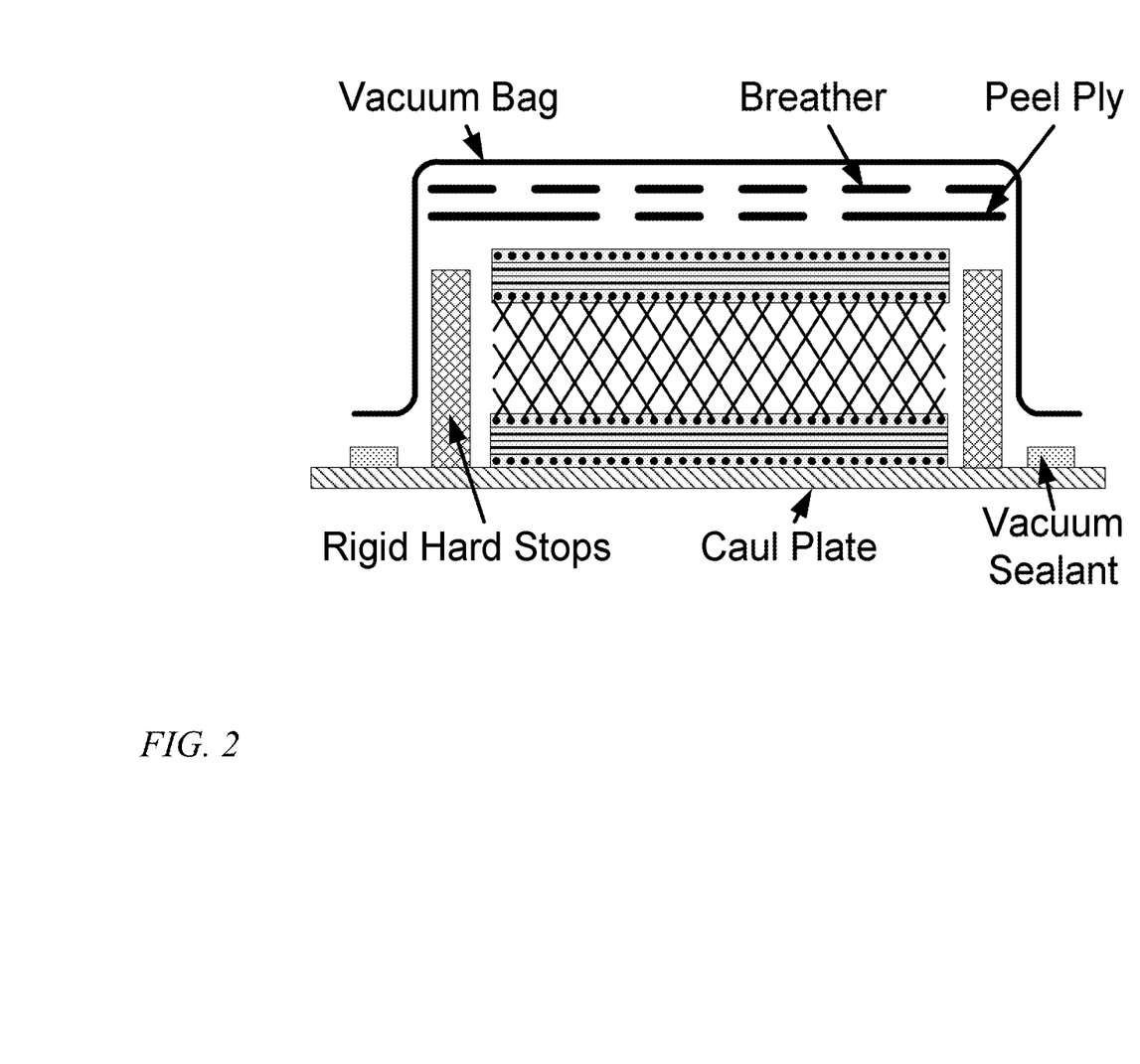
FIG. 2 is a schematic view of a fixture for curing an intermediate product in the fabrication of a ceramic matrix composite sandwich structure, according to an embodiment of the present invention.

Referring to FIG. 2 processing with the vacuum bag setup may involve evacuating a sealed enclosure, a portion of which is a vacuum bag, and another portion of which is a caul plate (or "mold" or "substrate") to which the vacuum bag is sealed, as illustrated. Edge dams (or "rigid hard stops") may be used along all outside edges of the sandwich when it is vacuum bagged, to prevent the in-plane pressure from the applied vacuum from destroying (e.g., crushing) the edges of the micro-truss core. The sandwich curing fixture and the sandwich may be assembled as illustrated in FIG. 2, from the bottom, beginning with the substrate or mold, facesheet, core, facesheet, Teflon coated glass peel-ply release, breather, and finally a caul plate or opposite mold half, which is optional. Additionally, if both of the sandwich facesheets are to be connected to the core at the same time, a layer of breather followed by Teflon coated glass peel-ply may be placed between the lower substrate and bottom facesheet of the sandwich panel. This entire assembly is bagged with KAPTON™ or high temperature nylon bagging film. If a thermal cure is used, a bagging film able to withstand the curing temperature (e.g., up to a 400° F., depending on the preceramic polymer used) may be used.

The caul plate of FIG. 2 is illustrated as being flat; in some embodiments it is curved, and a curved sandwich is fabricated.

As mentioned above, in some embodiments, the breather and peel-ply are used both above and below the sandwich structure when the sandwich facesheets are co-processed. When using a wet layup approach, the breather, although not required at the bottom surface, may be employed to balance the matrix volume fraction in both facesheets. Without the bottom breather layer, there may be a greater preceramic polymer resin content in the lower facesheet.

Referring again to FIG. 1, in an act 125 the preceramic polymer may then be cured (i.e., it may be subjected to a curing process), in an act 125. The cure cycle for the initial polymer cure of the infiltrated sandwich depends upon the preceramic polymer chosen for the matrix. The cure cycle may include heating the sandwich to a temperature of at least 176° C. (350° F.) for at least 8 hours. Regardless of the preceramic polymer used for the matrix, pressure may be applied to the layup to force the core endings into the optional interface layer (e.g., the one or more layers of veil) and into the preceramic matrix facesheets during cure. Pressures used during cure may be in the range 0.35 MPa-0.7 MPa (50 psi-100 psi, 3 atmospheres-6 atmospheres) and may be applied using a hot press or autoclave plus vacuum. The applied pressure is adjusted based on the thickness and architecture of the core as well as the geometry of the sandwich structure. A curved sandwich may be formed using suitably curved molds, in a hot press or in a heat-only curing process.

If pre-cured facesheets are used (i.e., if the optional facesheet curing process 110 is performed before the sandwich structure is laid up), each facesheet may be coated with a preceramic resin bonding layer, and the pre-cured facesheets may be, in an act 130, attached to the core with the preceramic resin bonding layer and cured, e.g., following the same curing cycle parameters (e.g., using a cure temperature of at least 350° F. and a curing time of at least 8 hours).

In some embodiments, once the sandwich structure is fully assembled and cured, it is pyrolyzed (i.e., it is subjected to a pyrolyzing process) in an act 135 to drive off organic components and to convert the preceramic material to a ceramic. If the core is composed of ceramic, the facesheets are pyrolyzed in this process. Pyrolysis may performed under light pressure (e.g. the weight from a graphite mold), or with no pressure, in an inert atmosphere such as nitrogen or argon. To apply pressure during pyrolysis, this process may utilize the male and/or female molds for the structure with appropriate manifolds to ensure inert gas flow to the interior and exterior of the sandwich. Molds may be made of graphite or other material that is able to withstand the high temperatures observed during pyrolysis (e.g., exceeding 1000° C.).

Facesheet pyrolysis may be performed at temperatures exceeding 850° C. in an inert atmosphere (i.e., in one more inert gases) with heating and cooling ramp rates between 1° C. per minute and 5° C. per minute. In the case of a flat panel, graphite plates may be placed on the upper surface to apply light pressure to maintain and enforce the sandwich panel bond. When pyrolyzing panels with complex curvature, graphite tooling may be used to maintain the proper shape and preserve the bond between the core and facesheets. This can be done using either an open or closed mold. In an open mold, either the male or female mold may be used on its own to provide a surface to hold the part during pyrolysis. A closed mold may be used in conjunction with hard stops to prevent the structure from becoming over constrained and to allow the part to shrink. For example, the hard stops may prevent the mold from closing too much during pyrolysis. During pyrolysis, the mold may initially be able to press on the sandwich structure slightly. As the preceramic (core and facesheet) pyrolyzes, it may shrink in volume. The hard stops may then allow the sandwich not only to shrink in height, but also to slide on the mold or substrate laterally as it shrinks. Without the hard stops, the mold may essentially pin the sandwich in place; in such an embodiment it is possible that the sandwich may crack and break as it shrinks.

Figure 3:
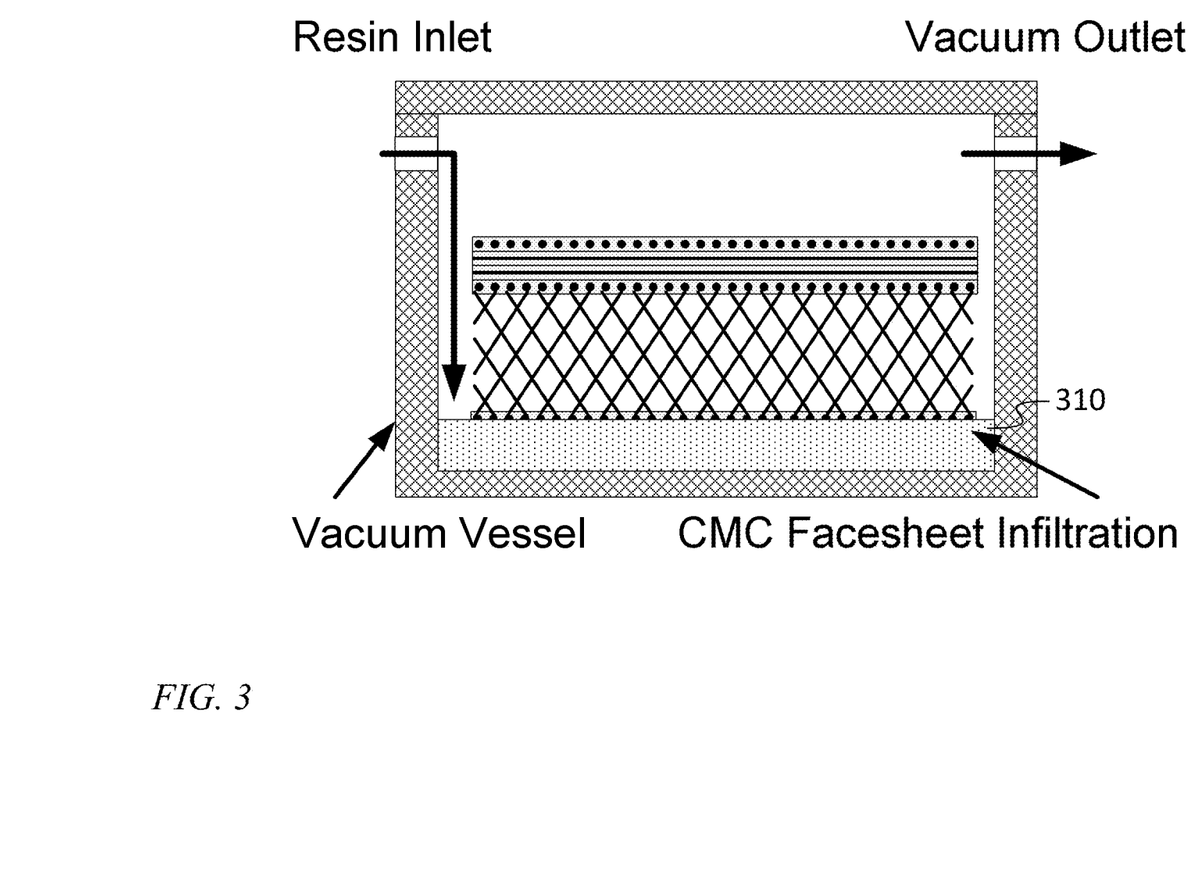
FIG. 3 is a schematic view of a fixture for re-infiltrating preceramic polymer resin into an intermediate product in the fabrication of a ceramic matrix composite sandwich structure, according to an embodiment of the present invention.

After this first pyrolysis, a series of re-infiltration and subsequent pyrolysis cycles may be performed, in an act 140. The sandwich panels are re-infiltrated with low viscosity preceramic polymer resin which is thermally cured, radiation cured, and/or cured during subsequent pyrolysis operations. This preceramic polymer resin may not require a thermal and/or photo initiator prior to pyrolysis. Referring to FIG. 3, in some embodiments, to infiltrate the voids in the facesheets, vacuum is pulled on the panel and held for at least 30 minutes. Preceramic polymer resin 310 is introduced to the chamber until the structure is fully immersed, and vacuum is held for another 30 minutes or more. The vacuum is released and atmospheric pressure is held for a final period of at least 30 minutes. At this point, the panel is removed from the preceramic polymer resin, drained for less than one minute and placed on a suitable mold or support (e.g., on the graphite tooling) and run through a full pyrolysis cycle. Each time the preceramic polymer resin is pyrolyzed, it undergoes a slight shrinkage, so the process of re-infiltration and pyrolysis is repeated several times to fill the voids that may result from this shrinkage, e.g., to ensure that the facesheets have little to no porosity. After repeating this cycle more than 5 times, mass gain in the facesheets reaches steady state (e.g., after 5 cycles, the porosity (as measured with picnometry (using, e.g., a gas picnometer)) may be less than 1% of the bulk density (as measured, e.g., using liquid pictometry)) and further infiltration cycles are not necessary. In some embodiments a sandwich structure including two facesheets and a core is fabricated; in some embodiments a structure including only one ceramic matrix facesheet and a ceramic core is fabricated in an analogous manner.

The present invention will be described in more detail below with reference to some examples. It should be understood that these examples are provided for exemplary purposes and are not to be construed as limiting the invention.

Examples

Figure 4:
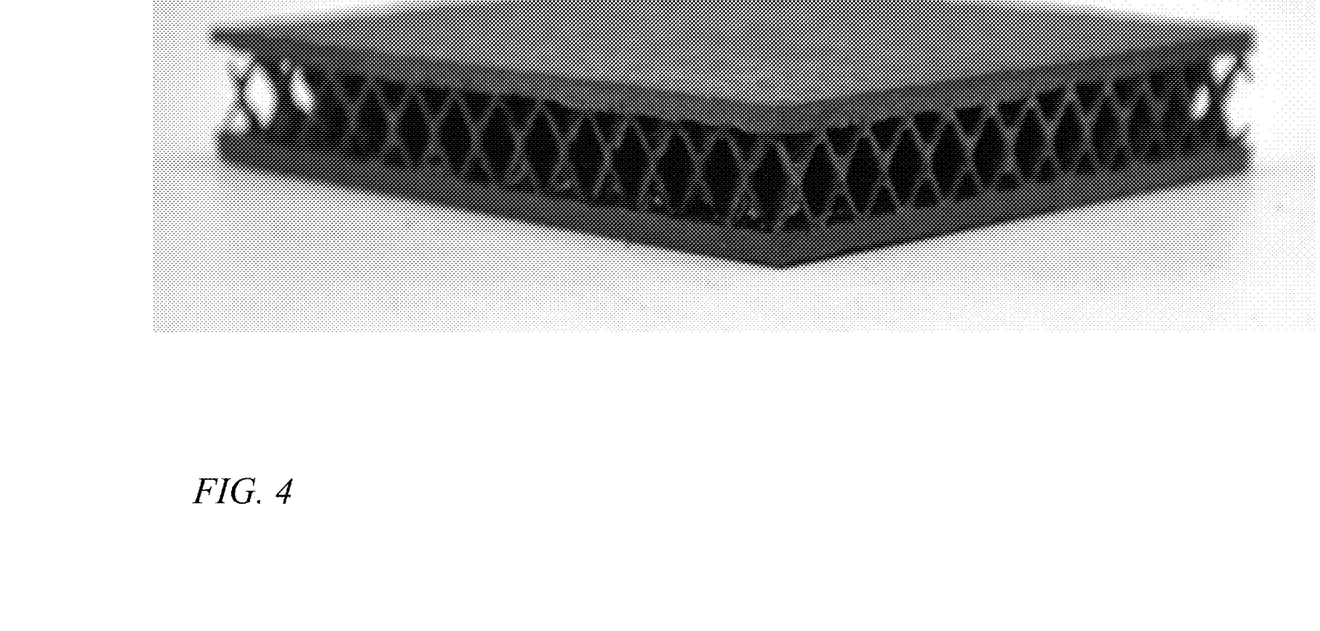
FIG. 4 is a photograph of a ceramic matrix composite sandwich structure, according to an embodiment of the present invention.
Figure 5:
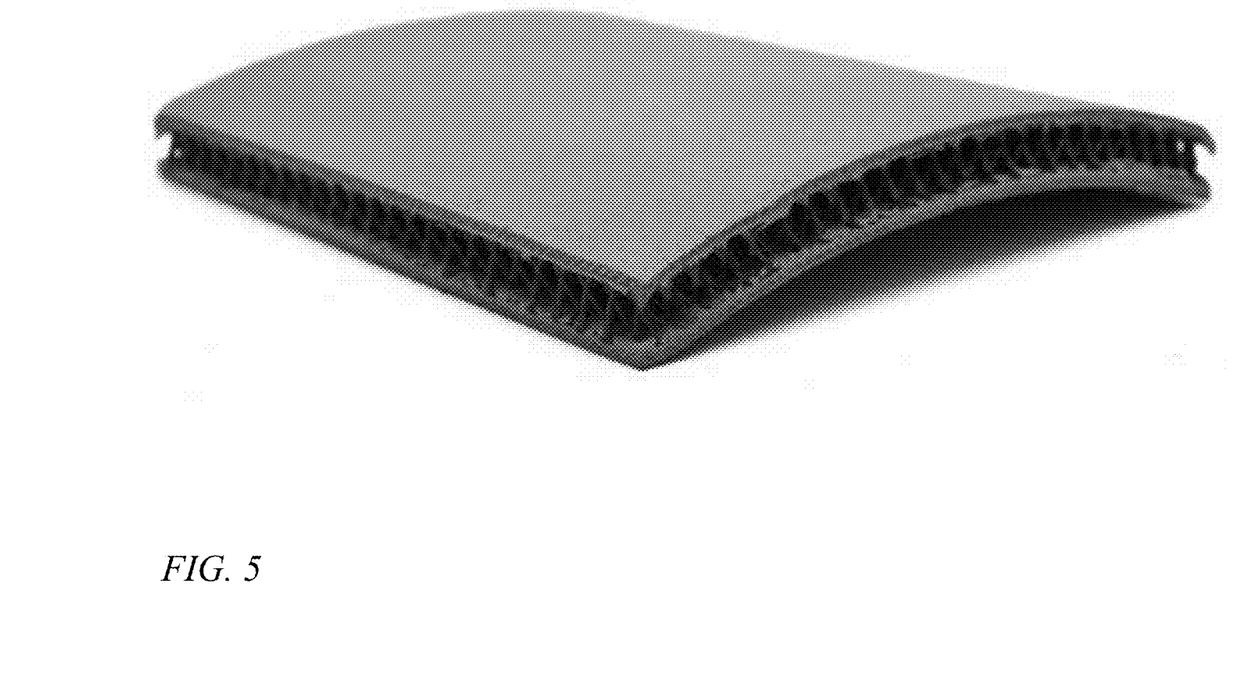
FIG. 5 is a photograph of a ceramic matrix composite sandwich structure, according to an embodiment of the present invention.
Figure 6A:
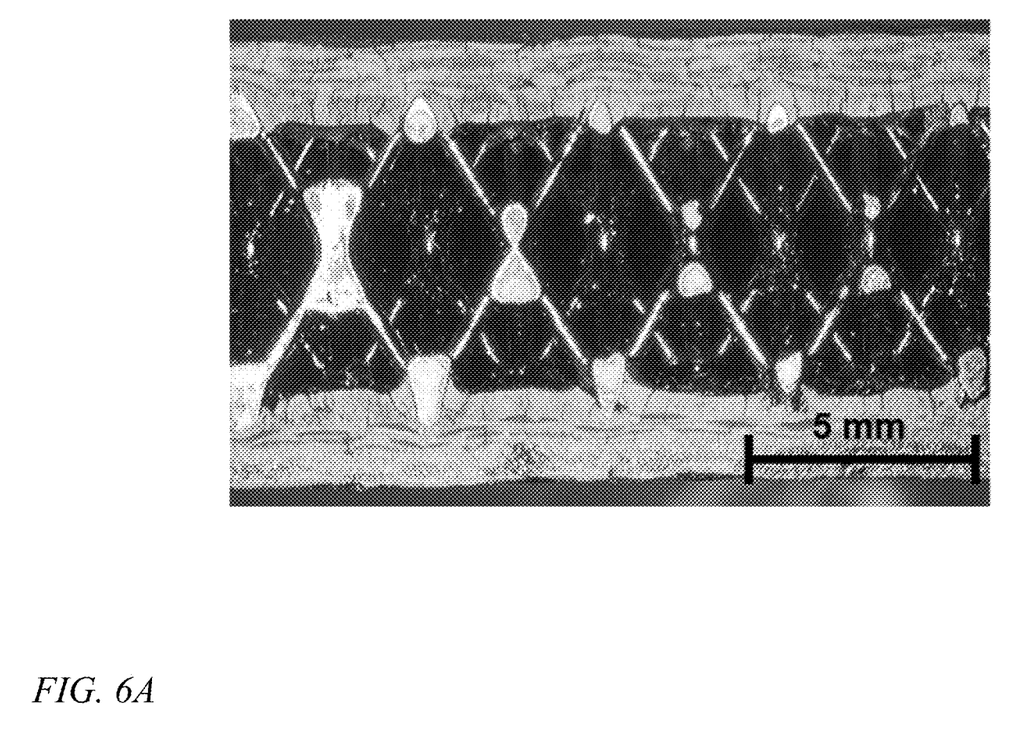
FIG. 6A is a photograph of a cross-section of a ceramic matrix composite sandwich structure, according to an embodiment of the present invention.
Figure 6B:
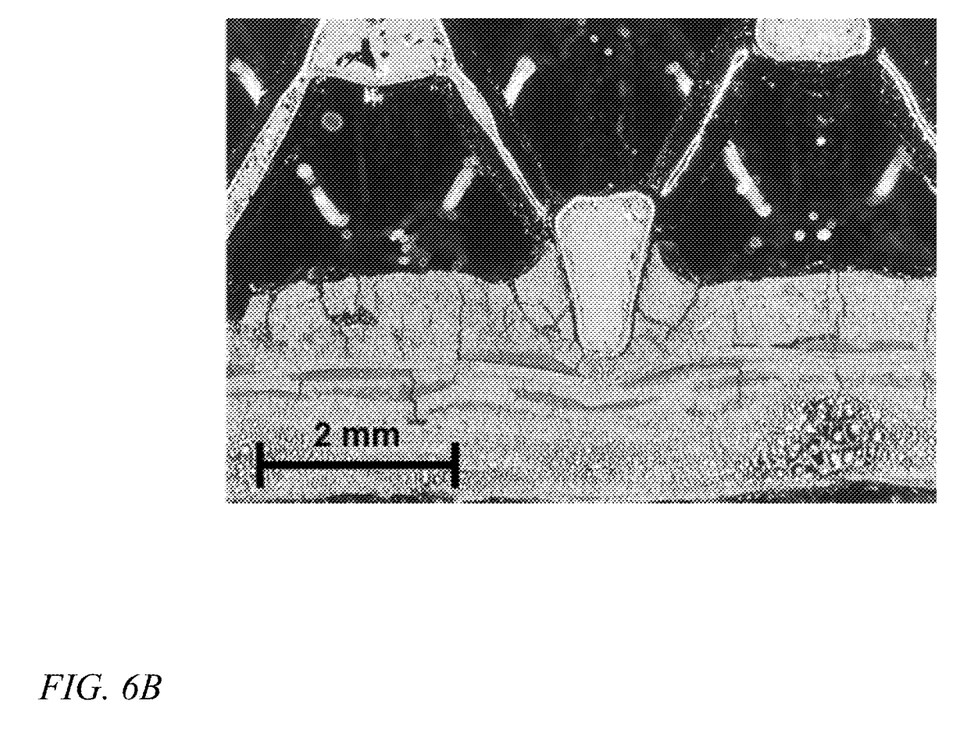
FIG. 6B is a photograph of a cross-section of a ceramic matrix composite sandwich structure, according to an embodiment of the present invention.
Figure 6C:
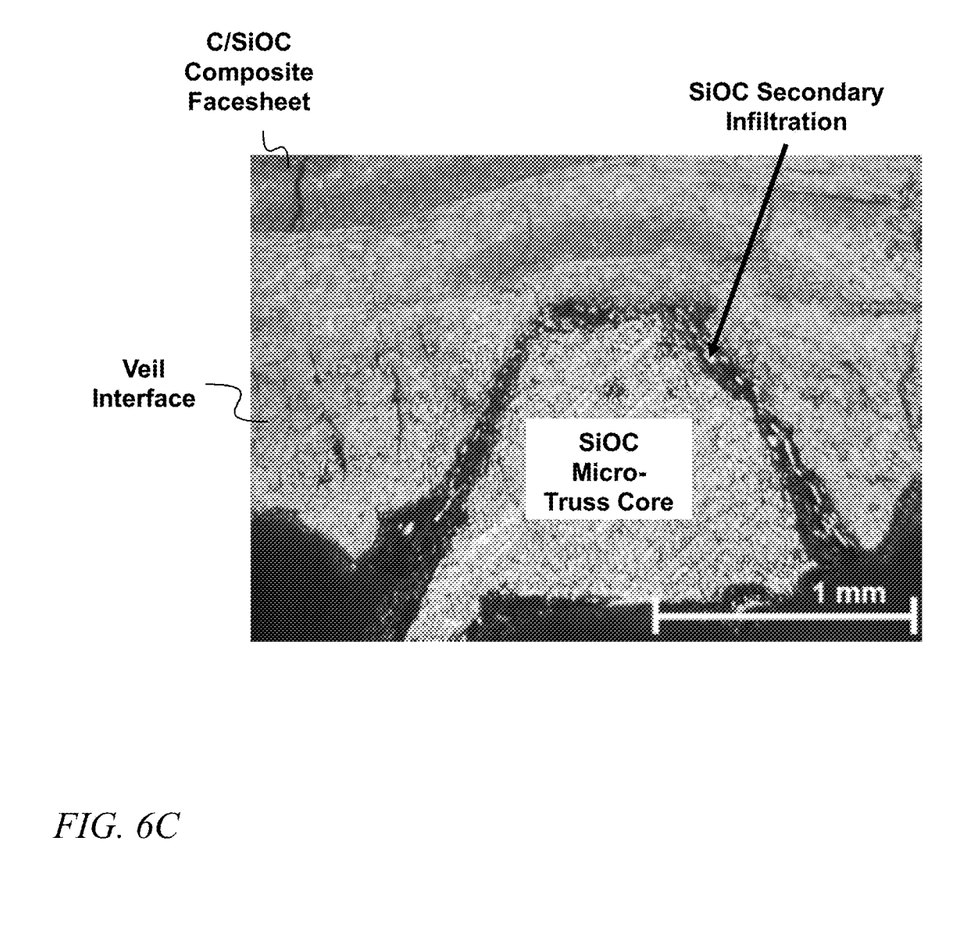
FIG. 6C is a photograph of a cross-section of a ceramic matrix composite sandwich structure, according to an embodiment of the present invention.

In a reduction to practice of two example embodiments, facesheets were made using a wet layup of preceramic polymer resin, dry carbon fiber weave, and an interface layer of carbon fiber veil. The facesheets were co-processed with a flat core and with a curved core, respectively, to form both a flat plate ceramic matrix composite sandwich panel (FIG. 4), as well as a sandwich panel with complex curvature (FIG. 5). The panel of FIG. 5 was formed using a graphite mold with dual curvature; the curvature was maintained in the integrated facesheets. FIGS. 6A-6C show images taken of the cross section after pyrolysis and post production were completed. These images show that the nodes of the microtruss core penetrated the veil interface, and that a successful mechanical bond was formed from the core to the facesheet.

In light of the foregoing, methods disclosed herein allow for the formation of a high strength, durable ceramic core to facesheet interface with significantly reduced cycle time (e.g., less than 8 days) and reduced cost. By creating an interface layer that allows for interpenetration of the core into the ceramic matrix composite facesheet, a robust mechanical interlock is formed between the core and each facesheet. Additionally, pyrolyzing the core and facesheets concurrently and then backfilling with a preceramic polymer reduces thermal expansion and mass loss issues that may limit related art processes in which individual constituents are pyrolyzed independently. As shown in FIG. 6C, the ceramic matrix composite structure may include a pyrolyzed core (e.g., a pyrolyzed SiOC micro-truss core), a pyrolyzed facesheet (e.g., a facesheet including carbon fibers in a SiOC matrix), and a secondary infiltrated and pyrolyzed material (e.g., the SiOC secondary infiltration of FIG. 6C) to mechanically interlock the core with the facesheet.

Figure 7A:
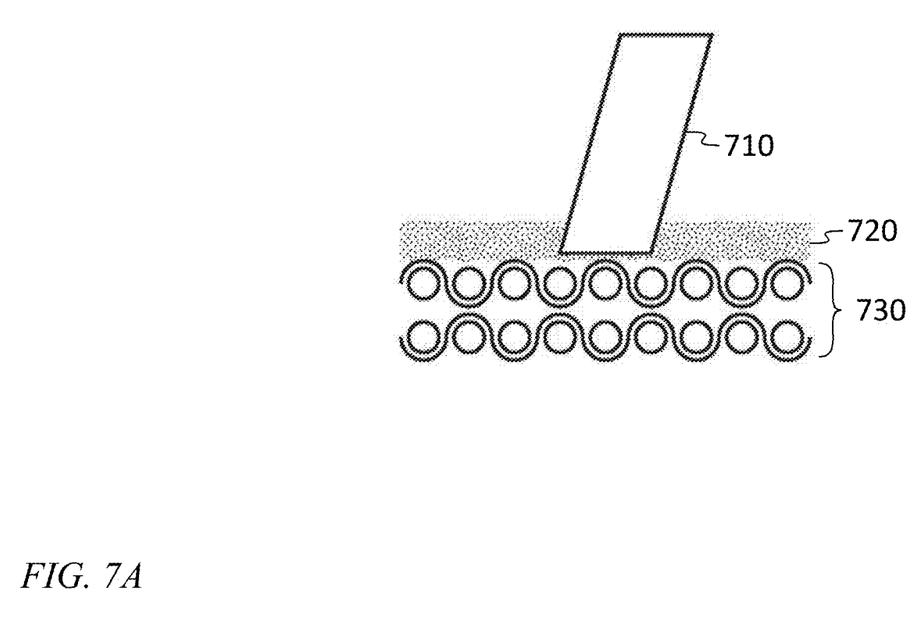
FIG. 7A is a schematic cross-section of a portion of a sandwich structure, according to an embodiment of the present invention.
Figure 7B:
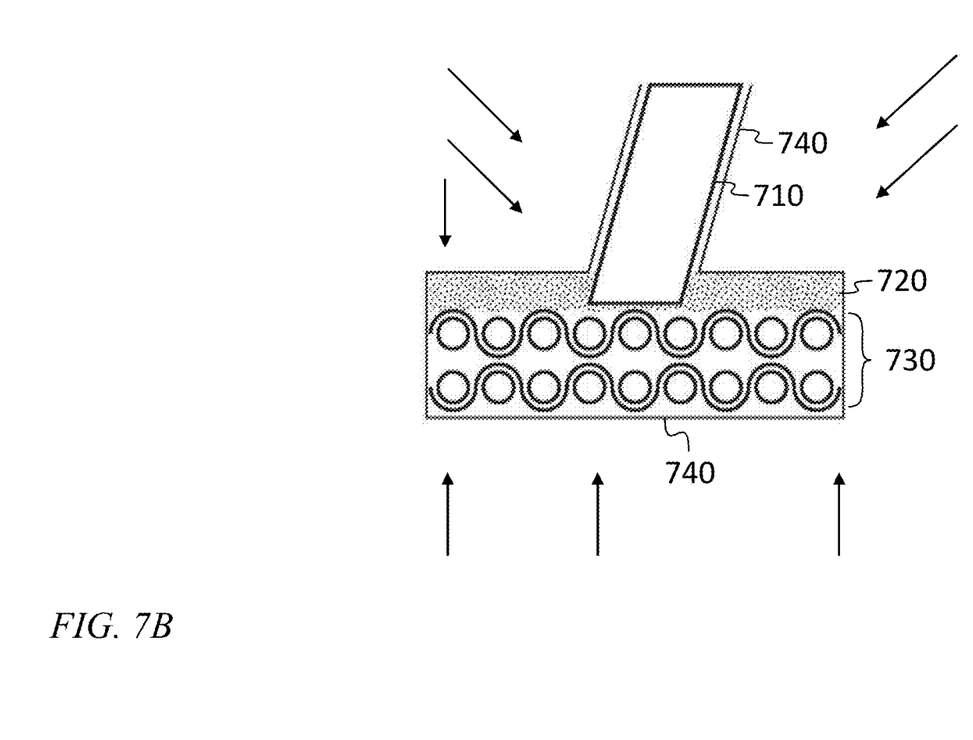
FIG. 7B is a schematic cross-section of a portion of a sandwich structure.
Figure 7C:
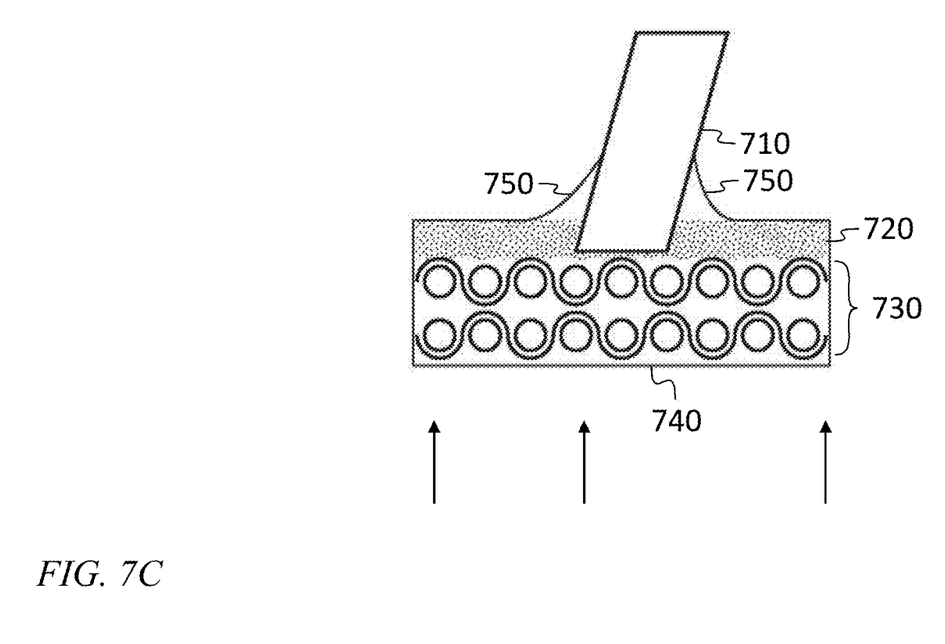
FIG. 7C is a schematic cross-section of a portion of a sandwich structure, according to an embodiment of the present invention.

FIGS. 7A-7C illustrate differences between structures that may be formed using methods according to embodiments of the present invention, and structures that may be formed by related art methods. FIG. 7A shows a portion of a dry sandwich structure including a pyrolyzed truss element 710, a dry engineered interface layer (e.g., veil) 720, and a dry fiber preform 730. The structure of FIG. 7A may be processed with omnidirectional infiltration, as illustrated by the arrows of FIG. 7B, e.g., using chemical vapor infiltration (CVI) and/or chemical vapor deposition (CVD), to form a structure infiltrated with a ceramic matrix 740. In such a structure, illustrated in FIG. 7B, the total diameter of the truss element may be increased. This increase in diameter may result in densification of the core, and a degradation of the characteristics of the structure, compared to a structure in which the density of the core remains lower. When a process according to an embodiment of the present invention is used (either with a pre-impregnated fiber preform being used instead of the dry fiber preform of FIG. 7A, or with the fiber preform being wet out with resin after assembly with the core), the effect may be one of frontal infiltration, resulting in the formation of a ceramic matrix 740 as shown in FIG. 7C. Because the re-infiltration is performed with liquid resin, surface tension in the resin may cause the resin to wick up into the core, resulting in the formation of a fillet 750 around each of the truss elements 710, and resulting, in turn, in a stronger junction between the truss elements 710 and the face sheet (which may include, as illustrated in FIG. 7C, the interface layer 720 and the fiber preform 730, impregnated with ceramic matrix 740).

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a method for fabrication of a ceramic matrix composite sandwich structure have been specifically described and illustrated herein, many modifications and variations will be apparent to those skilled in the art. Accordingly, it is to be understood that a method for fabrication of a ceramic matrix composite sandwich structure constructed according to principles of this invention may be embodied other than as specifically described herein. The invention is also defined in the following claims, and equivalents thereof.

What is claimed is:

1. A method for fabricating a composite structure, the method comprising:
   forming a core, the core comprising ceramics as a major component;
   forming a first facesheet, the first facesheet comprising a composite, the composite comprising ceramic fibers and a matrix, the matrix being a material selected from the group consisting of preceramic polymer resins, preceramic polymers, and combinations thereof;
   placing the first facesheet on a first surface of the core to form a preceramic assembly, the core interpenetrating into the first facesheet; and
   concurrently subjecting the first facesheet and the core of the preceramic assembly to a first pyrolyzing process.

2. The method of claim 1, further comprising, after placing the first facesheet on the first surface of the core, and before concurrently subjecting the first facesheet and the core of the preceramic assembly to the first pyrolyzing process:
   subjecting the preceramic assembly to a curing process.

3. The method of claim 2, wherein the curing process comprises evacuating a sealed enclosure, a first portion of the sealed enclosure being a vacuum bag containing the preceramic assembly.

4. The method of claim 3, wherein a second portion of the sealed enclosure is a caul plate, the sealed enclosure further containing one or more edge dams secured to the caul plate around a perimeter of the preceramic assembly.

5. The method of claim 4, wherein the subjecting of the preceramic assembly to the curing process comprises applying pressure to the preceramic assembly with a hot press.

6. The method of claim 5, wherein the applying of pressure comprises applying between 50 pounds per square inch and 100 pounds per square inch of pressure.

7. The method of claim 3, wherein the curing process further comprises
   before evacuating the sealed enclosure, placing a layer of peel ply on the first facesheet and placing a layer of breather on the layer of peel ply.

8. The method of claim 2, further comprising placing a second facesheet on a second surface of the core, and wherein the preceramic assembly further comprises the second facesheet.

9. The method of claim 8, further comprising
   before concurrently subjecting the first facesheet and the core of the preceramic assembly to a curing process, placing a layer of peel ply on the second facesheet and placing a layer of breather on the layer of peel ply.

10. The method of claim 1, wherein the forming of the core comprises illuminating a volume of preceramic polymer resin through a mask with collimated light to form a preceramic polymer micro-truss, the preceramic polymer micro-truss comprising:
    a plurality of first truss elements defined by a plurality of first self-propagating preceramic polymer waveguides and extending along a first direction;
    a plurality of second truss elements defined by a plurality of second self-propagating preceramic polymer waveguides and extending along a second direction; and
    a plurality of third truss elements defined by a plurality of third self-propagating preceramic polymer waveguides and extending along a third direction.

11. The method of claim 10, wherein the forming of the core further comprises pyrolyzing the preceramic polymer micro-truss.

12. The method of claim 1, wherein the first facesheet further includes a layer of veil.

13. The method of claim 12, wherein the layer of veil is a layer of carbon fiber veil.

14. The method of claim 1, further comprising, after concurrently subjecting the first facesheet and the core of the preceramic assembly to the first pyrolyzing process:
    infiltrating a ceramic assembly with preceramic polymer resin under vacuum; and
    subjecting an infiltrated assembly to a second pyrolyzing process, wherein:
       the ceramic assembly is a result of concurrently subjecting the first facesheet and the core of the preceramic assembly to the first pyrolyzing process, and
       the infiltrated assembly is a result of infiltrating the ceramic assembly with preceramic polymer resin under vacuum.

15. The method of claim 14, further comprising repeating infiltrating and pyrolyzing cycles until a porosity is less than 1%.

16. The method of claim 1, wherein the first facesheet comprises, as a major component, a material selected from the group consisting of preceramic polymers, ceramics, and combinations thereof.

17. The method of claim 16, further comprising coating the first facesheet with a preceramic polymer resin before placing the first facesheet on the first surface of the core.

18. The method of claim 1, wherein the core is curved.

19. The method of claim 18, wherein the concurrently subjecting the first facesheet and the core of the preceramic assembly to the first pyrolyzing process comprises supporting the preceramic assembly on a curved surface of a graphite mold.

20. The method of claim 1, wherein forming of the core comprises printing a preceramic polymer core with a three dimensional printer.

* * * * *